(12) United States Patent
Lindner et al.

(10) Patent No.: US 6,813,029 B1
(45) Date of Patent: Nov. 2, 2004

(54) INTERFEROMETRIC MEASURING DEVICE FOR FORM MEASUREMENT

(75) Inventors: Michael Lindner, Leutenbach (DE); Pawel Drabarek, Tiefenbronn (DE)

(73) Assignee: Robert Bosch GmbH, Stuttgart (DE)

( * ) Notice: Subject to any disclaimer, the term of this patent is extended or adjusted under 35 U.S.C. 154(b) by 269 days.

(21) Appl. No.: 10/089,621

(22) PCT Filed: Oct. 9, 2000

(86) PCT No.: PCT/DE00/03547

§ 371 (c)(1),
(2), (4) Date: Aug. 7, 2002

(87) PCT Pub. No.: WO01/27558

PCT Pub. Date: Apr. 19, 2001

(30) Foreign Application Priority Data

Oct. 9, 1999 (DE) .......................... 199 48 813
Sep. 26, 2000 (DE) .......................... 100 47 495

(51) Int. Cl.[7] ................................................. G01B 9/02
(52) U.S. Cl. ...................................................... 356/497
(58) Field of Search ............................... 356/479, 497; 250/227.19, 227.27; 385/12

(56) References Cited

U.S. PATENT DOCUMENTS

| | | | |
|---|---|---|---|
| 3,849,003 A | | 11/1974 | Velzel |
| 5,155,363 A | | 10/1992 | Steinbichler et al. |
| 5,321,501 A | * | 6/1994 | Swanson et al. ............ 356/479 |
| 5,493,398 A | | 2/1996 | Pfister |
| 5,519,491 A | * | 5/1996 | Gaechter et al. ............ 356/497 |
| 5,933,237 A | | 8/1999 | Drabarek |
| 5,943,133 A | * | 8/1999 | Zeylikovich et al. ........ 356/496 |

FOREIGN PATENT DOCUMENTS

| | | |
|---|---|---|
| DE | 41 08 944 | 9/1992 |
| DE | 196 25 830 | 1/1998 |
| DE | 197 21 842 | 12/1998 |
| DE | 197 21 843 | 2/1999 |
| JP | 03 120436 | 5/1991 |
| WO | WO 92 19930 | 11/1992 |

OTHER PUBLICATIONS

Patent Abstracts of Japan, vol. 015, No. 327 (P-1240), (Aug. 20, 1991).
P. de Groot, L. Deck, "Surface Profiling by Analysis of White–Light Interferograms in the Spatial Frequency Domain" J. Mod. Opt., vol. 42, No. 2, 389–401, (1995).
No. T. Maack, G. Notni, W. Schriber, W.–D. Prenzel, "Endoscopic 3–D Shape Measuring System", Jahrbuch fur Optik und Feinmechanik, Ed. W–D. Prenzel, 231–240, (1998).

* cited by examiner

*Primary Examiner*—Samuel A. Turner
(74) *Attorney, Agent, or Firm*—Kenyon & Kenyon (57) ABSTRACT

The present invention relates to a interferometric measuring device for measuring the shape especially of rough surfaces of a measured object (O), having a radiation-producing unit (SLD) emitting short-coherent radiation, a beam splitter (ST1) for forming a first and a second beam component (T1, T2), of which the first is directed via an object light path to the measured object (O), and the second is directed via a reference light path to a reflecting reference plane (RSP), having a superposition element at which the radiation coming from the measured object (O) and the reference plane (RSP) are brought to superposition, and an image converter (BS), which receives the superposed radiation and sends corresponding signals to a device for evaluation, for the measurement to be taken, the optical path length of the object light path being changed relative to the optical path length of the reference light path. An exact measuring of object surfaces in narrow cavities, in three dimensions, having great accuracy, is made possible by providing in the optical light path an optical probe (OS, OSO) having an optical arrangement for producing at least one optical intermediate image.

8 Claims, 5 Drawing Sheets

INTERFEROMETRIC MEASURING DEVICE FOR FORM MEASUREMENT

BACKGROUND INFORMATION

The present invention relates to an interferometric measuring device for measuring the shape especially of rough surfaces of a measured object, having a radiation-producing unit emitting short-coherent radiation, a beam splitter for forming a first and a second beam component, of which the first is directed via an object light path to the measured object and the second is directed via a reference light path to a reflective reference plane, having a superposition element at which the radiation coming from the measured object and the reference plane are brought to superposition, and an image converter which receives the superposed radiation and sends corresponding signals to a device for evaluation, the optical path length of the object light path being changed relative to the optical path length of the reference light path.

Such an interferometric measuring device is known from German DE 197 21 842 C2. In the case of this known measuring device, a radiation-producing unit, such as a light-emitting diode or a superluminescent diode, emits a short-coherent radiation, which is split via a beam splitter into a first beam component guided over an object light path, and a second beam component guided over a reference light path. The reference light path is periodically changed, using two deflector elements and a stationary diffraction grating positioned behind it, by activating the deflector elements, so as to scan the object surface in the depth direction. If the object light path and the reference light path coincide, a maximum interference contrast results, which is detected using an evaluation device post-connected to the photodetector device.

An interferometric measuring device representative of the measuring principle (white-light interferometry or short-coherent interferometry) is also specified in German DE 41 08 944 A1. Here, however, a moved mirror is used to change the light path in the reference ray path. In this method, the surface of the object is imaged on the photodetector device, using an optical system, it being difficult, however, to conduct measurements in cavities.

Additional such interferometric measuring devices and interferometric measuring methods based on white-light interferometry are described by P. de Groot, L. Deck, "Surface Profiling by Analysis of white-Light Interferograms in the Spatial Frequency Domain" J. Mod. Opt., Vol. 42, No. 2, 389–401, 1995 and No. T. Maack, G. Notni, W. Schreiber, W.-D. Prenzel, "Endoskopisches 3-D-Formmesssystem", (Endoscopic 3-D Shape Measuring System) in Jahrbuch für Optik und Feinmechanik, Ed. W.-D. Prenzel, Verlag (publisher) Schiele und Schoen, Berlin, 231–240, 1998 verwiesen (submitted).

In the case of the interferometric measuring devices and measuring methods named, one difficulty is making measurements in deep cavities or narrow ducts. One suggestion for a measuring device in which measurements can be performed even in cavities, using white-light interferometry, is shown in German DE 197 21 843 C1. It is proposed there to split a first beam component further into a reference beam component and at least one measuring beam component, an additional beam splitter and the reference mirror being positioned in a common measuring probe. To be sure, such a measuring probe can be introduced into cavities, however, using this device, in each measurement, only a small, dot-like location in the surface can be scanned. In order to take the measure of more locations on the surface in the depth direction, relative motion between measured object and measuring probe is required, an exact lateral coordination, however, being costly and difficult.

The object of the present invention is to make available an interferometric measuring device, of the kind mentioned at the outset, which especially makes possible simplified measurements in deep cavities with great accuracy.

This object is achieved by the features of claim 1. According to this it is provided that an optical probe in the object light path, having an optical device for generating at least one optical intermediate image, be provided.

Similarly to an endoscope or a borescope, in using the optical device, because of the intermediate images, it becomes possible to image the observed surface, besides using high longitudinal resolution, also at high lateral resolution over a path which is long compared to the diameter of the imaging optics. For example, the optical probe can be introduced into the bores of valve seats or into vessels of organisms for the purpose of medical measurements. In contrast to the usual endoscope, quantitative depth information is now obtained. In this connection, an advantageous embodiment is one in which the at least one intermediate image is generated in the object light path. For this, the same optical device is used for illuminating the measured location on the measured object as for transmitting the radiation coming from the measured object to the photodetector device, if it is provided that both the radiation going to the measured object and the radiation coming back from it pass through the optical probe.

The optical image on the photodetector device can be improved by providing, in the reference light path, an equal, further optical probe or at least a glass device for compensating for a glass proportion present in the optical probe with regard to the elements for the intermediate image(s).

A favorable construction, as far as handling is concerned, is one in which the optical motion difference between the first and the second arm is greater than the coherence length of the radiation; the radiation coming from the first mirror and the reflecting element are guided through a common optical probe (common path) using a further radiation portion; in the optical probe, a reference mirror is arranged at such a distance from the measured object that the motion difference between the first mirror and the reflecting element is canceled, and one part of the radiation incident on the reference mirror is reflected to the photodetector device and one part is allowed to pass through to the measured object and is reflected from there to the photodetector device. A further benefit of this design is that the object and reference waves pass through virtually the identical optics assembly, so that aberrations are substantially compensated for. Moreover, this set-up is more resistant to mechanical shocks. In this connection, two embodiment possibilities are for the reference mirror to be provided on a flat face-plate or on a prism.

In this connection, handling can further be simplified by arranging a fiber optic element between the beam splitter and the further beam splitter.

In this design too, splitting essentially into a probe part and a part having a modulation arrangement is realized, handling being also favored.

The present invention is elucidated in the following on the basis of exemplary embodiments, with reference to the drawings. The figures show.

Figure 1:
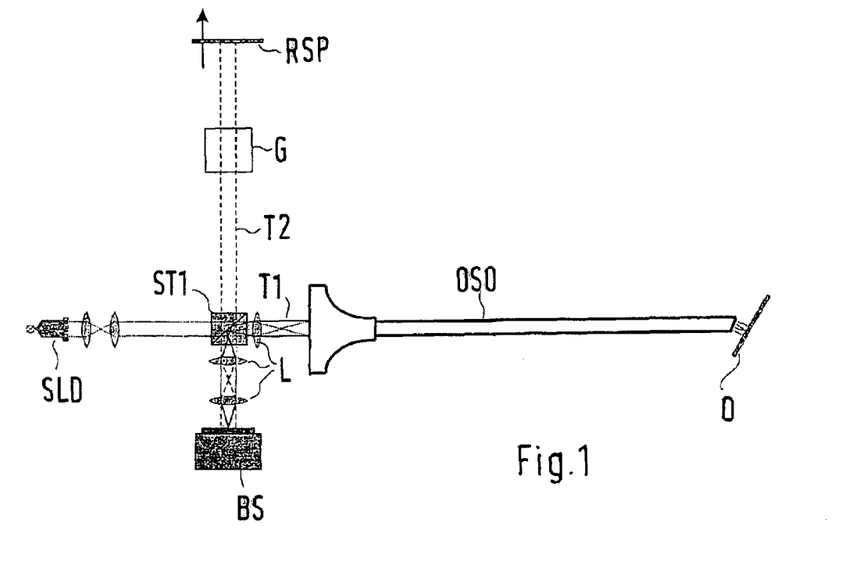
FIG. 1 a first exemplary embodiment of an interferometric measuring device having an optical probe in a measured light path.

FIG. 1 shows an interferometric measuring device having a radiation-producing unit SLD emitting short-coherent radiation, as, for example a light-emitting diode or a superluminescent diode, whose radiation is split by a beam splitter ST1 into a first beam component T1 of a measured light path and a second beam component T2 of a reference light path. The design is like that of a Michelson interferometer. In the reference light path, the second beam component is reflected by a reference plane in the form of a reference mirror RSP, the reference light path being periodically changed by moving the reference mirror RSP or by acoustooptical deflectors, as described in German DE 197 21 842 C2, mentioned at the outset. If the change of the light path is performed using two acoustooptical deflectors, a mechanically moved reflecting element becomes unnecessary, but instead, a fixed element, particularly a diffraction grating, can be used. By using a glass block G, the dispersion of an optical probe OSO arranged in the object light path can be corrected as necessary.

In the object light path, the radiation is coupled into optical probe OSO, so that the radiation illuminates the surface to be measured of measured object O. The surface of the object is imaged by optical probe OSO via one or more intermediate images on photodetector equipment in the form of an image converter or image sensor BS, for instance, a CCD camera. The image of measured object O on image sensor BS is superposed with the reference wave of the second beam component. A high interference contrast occurs in the image of measured object O when the path difference in the reference light path and the measured light path is less than the coherence length. With regard to this, the measuring principle is based on white-light interferometry (short-coherent interferometry), as is described in greater detail in the documents mentioned at the outset. The length of the reference light path is varied over the entire measuring range for scanning in the depth direction of the surface to be measured, the length of the reference light path being detected for each measured point at which the greatest interference contrast appears. It is made possible by the intermediate images to image the surface of the measured object at a high lateral resolution over a range that is large compared to the diameter of the imaging optics. Optical probe OSO resembles an endoscope and a borescope, however, the illumination and the feedback of the radiation coming from the measured surface via the same optical device occurring via at least one intermediate image. FIG. 1 shows schematically some lenses L as further imaging elements. The actual intermediate images are created in optical probe OSO.

Figure 2:
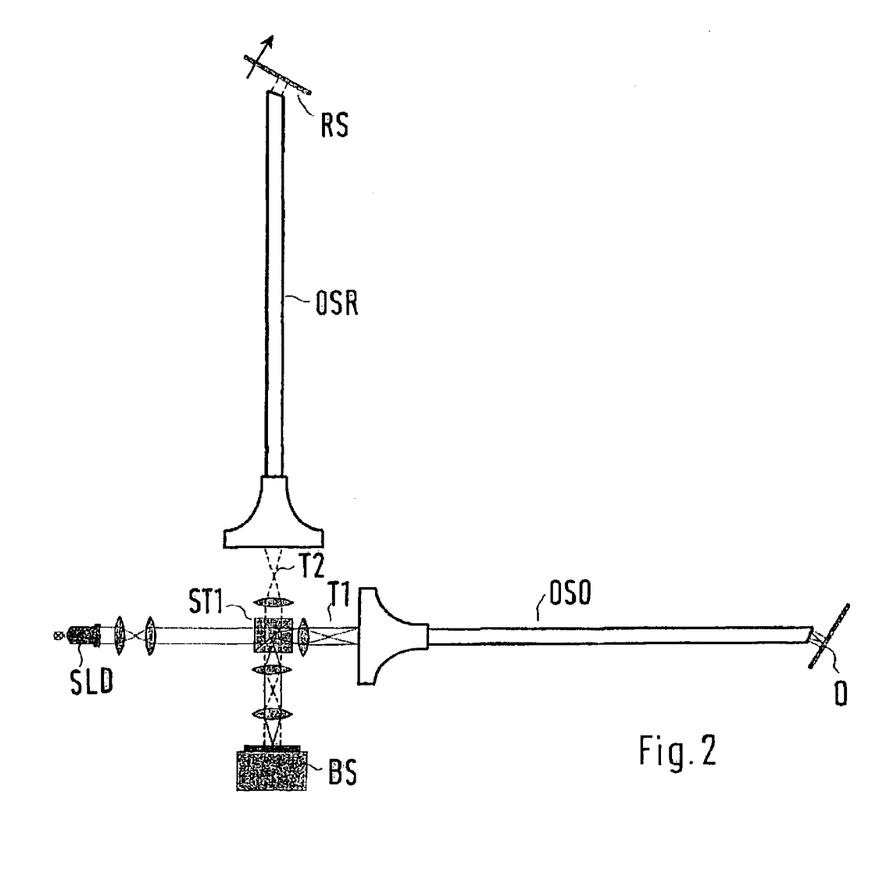
FIG. 2 a second exemplary embodiment in which an optical probe is provided both in the measured light path and in the reference light path.

For applications, in which an exact compensation for the influence of the imaging lenses of optical probe OSO is required, the same optical probe OSR is also integrated in the reference light path or reference arm between beam splitter ST1 and reference mirror RSP as in the object light path between beam splitter ST1 and measuring object O, as shown in FIG. 2.

Figure 3:
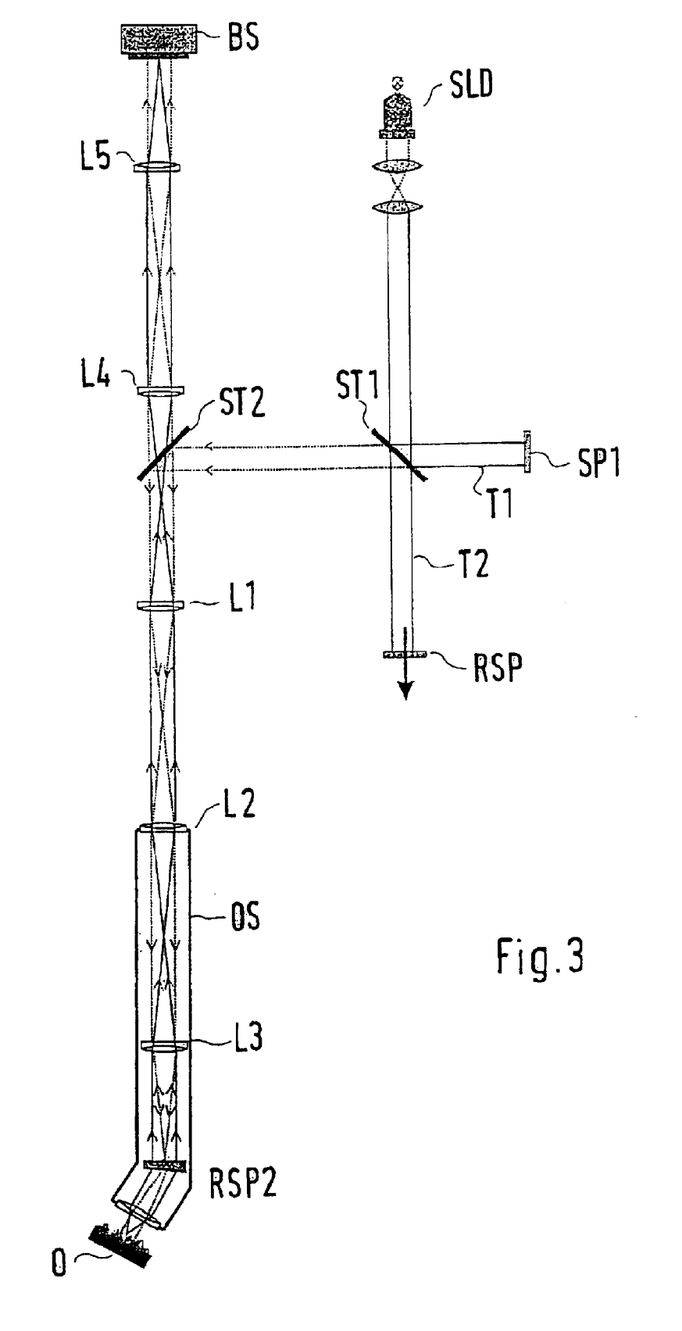
FIG. 3 a design of the interferometric measuring device having a common reference and measured light path.

In a modified design according to FIG. 3, the interferometric measuring device may also be realized as a device having common reference and measuring arms (common path device). The interferometric measuring device is again illuminated by a short-coherent (broadband) radiation-producing unit. Beam splitter ST1 splits the light in two arms into first beam component T1 and second beam component T2, first beam component T1 falling on a first, fixed mirror SP1, and second beam component T2 falling on reflecting element RSP in the form of a reference mirror.

The optical path difference between the arms thus formed is greater than the coherence length of the radiation produced by radiation-producing unit SLD. Starting from the two mirrors SP1 and RSP, the reflected radiation is fed to optical probe OS via beam splitter ST1 and a further beam splitter ST2. The special quality of this design is that there is a reference mirror RSP2 in optical probe OS itself.

A part of the radiation is reflected by this reference mirror RSP2, while the other part of the radiation illuminates the surface to be measured. Reference mirror RSP2 may be mounted on flat face-plate or on a prism. By using a prism, the wave front of the radiation illuminating the object surface, i.e. of the object wave can be adapted to the geometry (e.g. inclination) of the surface to be measured. With the aid of optical probe OS, measured object O is in turn imaged via one or more intermediate images on image sensor BS, and superposed by the reference wave. In order to obtain height information, reflecting element RSP is made to traverse the measuring range, or changing the light path is undertaken as described above. In the image of measured object O great interference contrast appears when the path difference between fixed mirror SP1 and reflecting element RSP or of the light paths of the two arms is exactly the same as the optical path difference between reference mirror RSP2 and measured object O. In order to obtain the height profile, known methods for detecting the greatest interference contrast are used in each image point (pixel). The benefit of this design is that the object and reference waves pass through virtually the identical optics assembly, so that aberrations are substantially compensated for. Moreover, this set-up is more rugged and, therefore, less susceptible to mechanical shocks.

Figure 4:
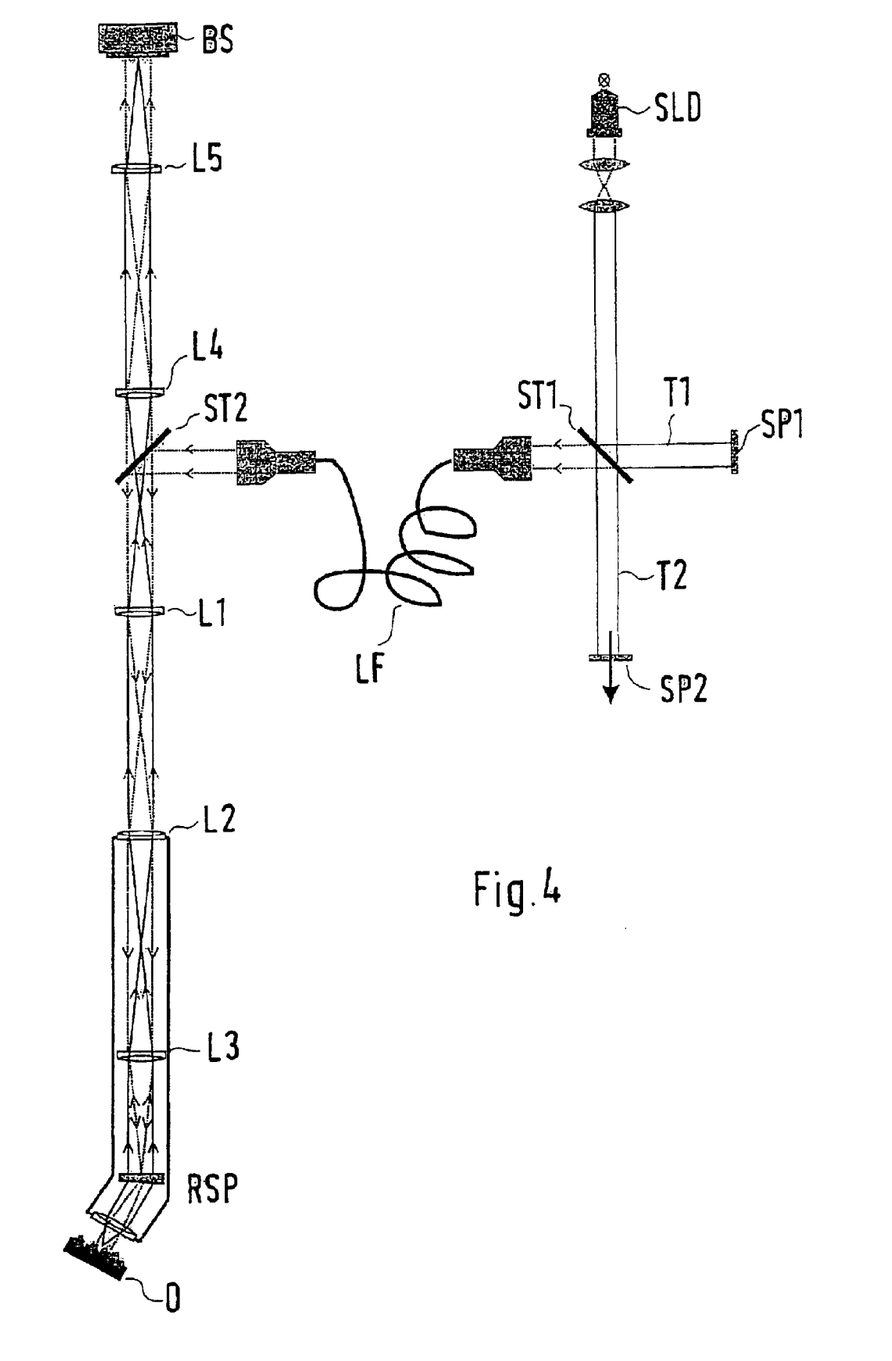
FIG. 4 a further exemplary embodiment in which, compared to FIG. 3, fiber optics are provided between the first and a further beam splitter.

For even simpler handling of the measuring device, the radiation of beam splitter ST1 can also be transmitted to further beam splitter ST1, using fiber optics LF, as is shown in FIG. 4.

Figure 5:
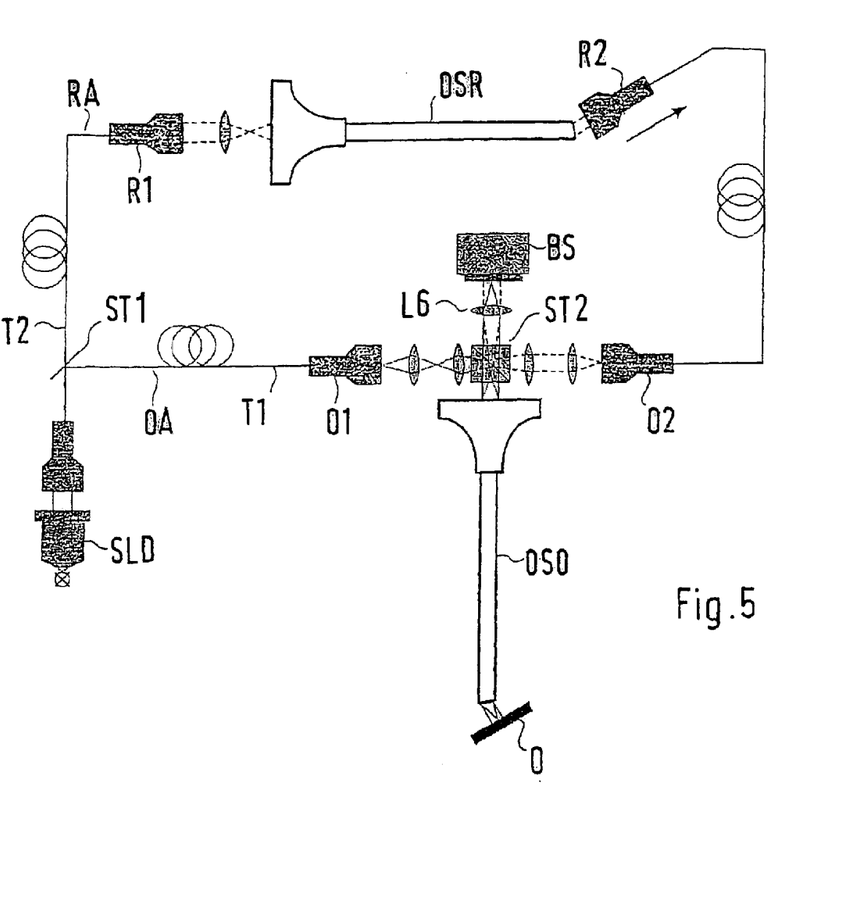
FIG. 5 a further design example of the interferometric measuring device.

A further alternative design is shown in FIG. 5. As an alternative to the design having the common reference path and measuring light path as in FIGS. 3 and 4, a combined Mach-Zehnder-Michelson arrangement is provided. Again, a broadband radiation-producing unit SLD is used, whose radiation is coupled into a fiber optic element. First beam splitter ST1 splits the radiation into an object arm OA and a reference arm RA. In object arm OA, first beam component T1 is coupled out of the corresponding light conducting fiber and coupled into optical probe OSO via further beam splitter ST2, so that the surface to be measured of measured object O is illuminated. The object surface is imaged by optical probe OSO via one or more intermediate images on image sensor BS. In reference arm RA light is coupled out of the corresponding light-conducting fiber, is then propagated, if necessary, through the same optical probe OSR as is applied in object arm OA, and is coupled in by a second fiber coupler R2 to a light-conducting fiber positioned there. The reference wave reaches further beam splitter ST2 via the light-conducting fiber. There it is uncoupled and superposed with the object wave on image sensor BS via further beam splitter ST2. In both arms, the optical paths in the air, in optical probes OSO or OSR as well as in the light-conducting fibers have to be adjusted. Tuning of the path lengths in reference arm RA is performed here, for example, by shifting second fiber coupler R2, so that the optical air path in the reference arm is changed.

What is claimed is:

1. An interferometric measuring device for measuring shape, including surfaces of a measured object, comprising:
    a radiation-producing unit emitting short-coherent radiation;
    a beam splitter for forming a first beam component and a second beam component, wherein the first beam component is directed via an object light path to the measured object and the second beam component is directed via a reference light path to a reflecting reference plane;
    a superposition element at which a radiation coming from the measured object and a radiation coming from the reflecting reference plane are brought to superposition;
    an image converter which receives the superposed radiation and sends corresponding signals to a device for evaluation, wherein, for the measurement, an optical path length of the object light path is changed relative to an optical path length of the reference light path; and
    an optical probe including an optical device for generating at least one optical intermediate image, wherein the optical probe is provided in the object light path.

2. The measuring device according to claim 1, wherein the at least one intermediate image is generated in the object light path.

3. The measuring device according to claim 2, wherein both the radiation directed to the measured object and the radiation returning from the measured object pass through the optical probe.

4. The measuring device according to claim 1, further comprising, in the reference light path, one of a further optical probe and a glass device for compensating for a glass proportion present in the optical probe with regard to the elements for the intermediate image.

5. The measuring device according to claim 1,
    wherein the first beam component formed by the beam splitter is first directed via a first arm to a fixed first mirror;
    wherein the second beam component is directed via a second arm to the reflecting element;
    wherein the optical path difference between the first and the second arm is greater than a coherence length of the radiation;
    wherein the radiations coming from the first mirror and the reflecting element are guided through a common optical probe using a further beam splitter;
    wherein in the optical probe, a reference mirror is arranged at a distance from the measured object such that the path difference between the first mirror and the reflecting element is canceled; and
    wherein one part of the radiation incident on the reference mirror is reflected to a photodetector device and another part is allowed to pass through to the measured object and is reflected from there to the photodetector device.

6. The measuring device according to claim 5, wherein the reference mirror is provided on one of a flat face-plate and a prism.

7. The measuring device as recited in claim 6, further comprising a fiber optic element positioned between the beam splitter and the further beam splitter.

8. The measuring device according to claim 1,
    wherein the radiation emitted by the radiation-producing unit is coupled into a fiber-optic element and is subsequently split by the beam splitter into the first and the second beam component;
    wherein the first beam component is coupled out of the fiber-optic in one object arm and coupled into the optical probe via a further beam splitter, and is guided to the measured object, from which the radiation is guided via an optical arrangement to a photodetector device; and
    wherein the second beam component in one reference arm is coupled out of the fiber-optic of the reference arm, passes through the further optical probe, is guided via a further fiber-optic element to the further beam splitter, and from there to the image converter for superposing with the radiation coming from the measured object.

* * * * *

UNITED STATES PATENT AND TRADEMARK OFFICE
CERTIFICATE OF CORRECTION

PATENT NO. : 6,813,029 B1
DATED : November 2, 2004
INVENTOR(S) : Michael Lindner It is certified that error appears in the above-identified patent and that said Letters Patent is hereby corrected as shown below:

Title page,
Item [57], ABSTRACT,
Line 1, delete "The present invention relates to"
Line 2, delete "especially"
Line 3, change "of a measured object:" to -- of a measured object is provided. --
Line 3, delete "(0), having"
Line 3, change "a radiation-producing unit" to -- The device includes a radiation-producing unit --
Line 4, delete "(SLD)"
Line 5, delete "(ST1)"
Lines 5-6, change "Component (T1, T2,)," to -- Component, --
Line 6, change "the first is directed" to -- the first may be directed --
Line 7, change "the measured object (0)," to -- the measured object, --
Line 8, change "reference plane (RSP)," to -- reference plane. --
Line 9, change "having a superposition element" to -- The device also includes a super position element --
Line 10, change "(RSP) are brought" to -- maybe brought --
Lines 10-11, change "image converter (BS)," to -- image converter --
Line 17, change "is made possible" to -- may be made possible --
Line 18, delete "(OS, 0S0)"

Column 1,
Line 5, change "Background Information" to -- Field of Invention --
Line 21, insert heading -- Background Information --
Line 22, change "Such an interferometric measuring device is known" to --Interferometric measuring devices are known --
Line 22, change "German DE 197 21 842 C2." to -- German published patent document No. 197 21 842. --
Line 22, change "of this known" to -- of this conventional --
Lines 39-40, change "German DE 41 08 944 Al" to -- German published patent document No. 41 08 944. --
Line 49, change "J. Mod. Opt.," to -- J. Mod. Opt., (italic) --
Line 53, change "Jahrbuch fur Optik und Feinmechanick," to -- Jahrbuch fur Optik und Feinmechanick, (italic) --
Line 55, change "1998 verwiesen (submitted)." to -- 1998 ( submitted). --
Line 59, change "measurements can be" to -- measurements may be --
Lines 61-62, change "is shown in German DE 197 21 843 C1." to -- is described in German published patent document No. 197 21 843. --
Line 62, change "It is proposed" to -- It is described --
Line 66, change "probe can be" to -- probe may be --

UNITED STATES PATENT AND TRADEMARK OFFICE
CERTIFICATE OF CORRECTION

PATENT NO.   : 6,813,029 B1
DATED        : November 2, 2004
INVENTOR(S)  : Michael Lindner It is certified that error appears in the above-identified patent and that said Letters Patent is hereby corrected as shown below:

Column 2,
Line 1, change "can be scanned." to -- may be scanned --
Line 6, insert heading -- Summary --
Line 10, delete "This object... claim 1."
Line 11, change "According to this" to -- According to the present invention --
Line 18, change "which is long" to -- which may be long --
Line 19 change "optical probe can be" to -- optical probe may be --
Line 22 change "is now obtained an advantageous" to -- may be now obtained. an example --
Line 23, change "embodiment is one" to -- embodiment may be one --
Line 25, change "optical device is used" to -- optical device may be used. --
Line 31, change "device can be" to -- device may be --
Line 37, change "is one in which" to -- may be one in which --
Line 40, change "are guided through" to -- may be guided through --
Line 49, change "is that the object" to -- may be that the object --
Line 51, change "aberrations are" to -- aberrations may be --
Line 53, change "two embodiment possibilities are" to -- two example embodiment possibilities may be --
Line 54, change "reference mirror to be provided" to -- reference mirror, provided --
Line 60, change "arrangement is realized" to -- arrangement may be realized --
Line 62, change "invention is elucidated" to -- invention is described --
Line 63, change "basis of exemplary embodiments," to -- basis of example embodiments, --
Line 64, insert heading -- Brief Description of the Drawings --
Line 65, change "FIG.1 a first exemplary embodiment" to -- FIG.1 illustrates an example embodiment --

Column 3,
Line 1, change "a second exemplary" to -- illustrates an example --
Line 4, change "FIG. 3 a design of" to -- FIG.3 an embodiment of --
Line 6, change "a further exemplary" to -- illustrates an example --
Line 10, change "a further design example of" to -- illustrates a further example embodiment of --
Line 12, insert heading -- Detailed Description --
Line 12, change "FIG. 1 shows" to -- FIG. 1 illustrates --
Line 15, change "radiation is split" to -- radiation may be split --
Line 18, change "design is like" to -- design may be like --
Line 19, change "component is reflected" to -- component may be reflected --
Line 23, change "German DE 197 21 842 C2." to -- German published patent document No. 197 21 842. --

UNITED STATES PATENT AND TRADEMARK OFFICE
CERTIFICATE OF CORRECTION

PATENT NO. : 6,813,029 B1
DATED : November 2, 2004
INVENTOR(S) : Michael Lindner It is certified that error appears in the above-identified patent and that said Letters Patent is hereby corrected as shown below:

Column 3 (cont'd),
Line 28, change "can be used." to -- may be used --
Line 29, change "light path can be" to -- light path may be --
Line 31, change "radiation is coupled" to -- radiation may be coupled --
Line 34, change "object is imaged" to -- object may be imaged --
Line 38, change "sensor BS is superposed" to -- sensor BS may be superposed --
Line 46, change "light path is varied" to -- light path may be varied --
Line 50, change "It is made possible" to -- It may be possible --
Line 58, change "shows schematically" to -- illustrates schematically --
Line 59, change "images are created" to -- images may be created --
Line 67, change "shown in FIG 2." to -- illustrated in FIG.2. --

Column 4,
Line 4, change "device is again:" to -- device may be again --
Line 16, change "this design is" to -- this design may be --
Line 18, change "radiation is reflected" to -- radiation may be reflected --
Line 23, change " ware can be adapted" to -- ware may be adapted --
Line 25, change "object O is" to -- object O may be --
Line 28, change "element RSP is made" to -- element RSP may be made --
Line 30, change "is undertaken" to -- may be undertaken --
Line 36, change "known methods" to -- conventional methods --
Line 38, change "design is" to -- design may be --
Line 39, change "aberrations are" to -- aberrations may be --
Line 40, change "set-up is more" to -- set-up is more --
Line 43, change "splitter ST1 can" to -- splitter ST1 may --
Line 44, change "as is shown" to -- as is illustrated --
Line 46, change "shown in FIG. 5." to -- illustrated in FIG. 5. --
Line 50, change "unit SKD is used,." to -- unit SKD may be used, --
Line 51, change " radiation is coupled" to -- radiation may be coupled --
Line 54, change "T1 is coupled" to -- T1 may be coupled --
Line 57, change "O is illuminated" to -- O may be illuminated --
Line 57, change "object surface is imaged" to -- object surface may be imaged --
Line 59, change "light is coupled" to -- light may be coupled --
Line 60, change "fiber is then propagated." to -- fiber may be then propagated. --
Line 61, change " as is applied" to -- as may be applied --
Line 62, change "and is coupled" to -- and may be coupled --
Line 65, change "it is uncoupled" to -- it may be uncoupled --

UNITED STATES PATENT AND TRADEMARK OFFICE
CERTIFICATE OF CORRECTION

PATENT NO. : 6,813,029 B1
DATED : November 2, 2004
INVENTOR(S) : Michael Lindner It is certified that error appears in the above-identified patent and that said Letters Patent is hereby corrected as shown below:

Column 5,
Line 3, change "arm RA is performed here" to -- arm RA may be performed here, --
Line 5, change "arm is changed" to -- arm may be changed --

Signed and Sealed this

Thirty-first Day of May, 2005

JON W. DUDAS
*Director of the United States Patent and Trademark Office*